No. 732,843.

Patented July 7, 1903.

UNITED STATES PATENT OFFICE.

WILLIAM GARDINER, OF CHICAGO, ILLINOIS, ASSIGNOR TO NORTHWESTERN STORAGE BATTERY COMPANY, A CORPORATION OF ILLINOIS.

METHOD OF PREPARING ELECTROLYTES.

SPECIFICATION forming part of Letters Patent No. 732,843, dated July 7, 1903.

Application filed January 23, 1902. Serial No. 90,941. (No specimens.)

*To all whom it may concern:*

Be it known that I, WILLIAM GARDINER, a citizen of the United States, residing at Chicago, in the county of Cook and State of Illinois, have invented new and useful Improvements in Methods of Preparing Electrolytes, of which the following is a specification.

In electric storage or secondary batteries of that type in which caustic potash or caustic soda in solution is used as the electrolyte and in which one of the electrodes is a support upon which zinc is deposited one great disadvantage is the weight and bulk of the electrolyte. Such an electrolyte has been heretofore produced by dissolving an oxid of zinc in a solution of hydrate of sodium and hydrate of potassium. A solution of hydrate of potassium or hydrate of sodium is capable of dissolving but a relatively small quantity of the oxid of zinc, and in order to obtain a secondary battery of this character having any considerable capacity it has heretofore been necessary to employ in each case an exceedingly large quantity or volume of solution. This has made such secondary batteries very heavy and bulky in proportion to their effectiveness.

In carrying out my invention I use suitable electrodes. Any of the well-known electrodes employed in this class of battery, however, may be used, such as oxid of copper, for example, as the negative electrode and a support of copper gauze or iron gauze upon which the zinc is deposited in the charge as the positive electrode.

I produce my improved electrolyte by means of a strong solution, preferably of pure caustic potash, in which I dissolve pure oxid of zinc made by the wet process. This solution is placed in the cells of a battery having suitable electrodes and subjected to a charging-current in the well-known way until the greater portion of the zinc contained in the solution is deposited upon the positive element. This solution is then removed from the cells and placed in a suitable receptacle for holding it temporarily. Oxid of zinc is then again dissolved in this solution and the solution replaced in the same cells as before and a charging-current applied and the zinc deposited as before. This may be repeated and the process continued until zinc sufficient to equal the capacity of the desired battery is deposited or accumulated upon the positive electrode. When a sufficient quantity of zinc is deposited upon the positive electrode, the solution used to dissolve the oxid of zinc may be removed and a strong fresh solution of pure caustic potash and water containing no zinc oxid substituted. The battery is then in readiness for discharge and charge in the performance of work. During the discharge the zinc accumulated upon the positive electrode in the prior charges dissolves or is taken up in the solution, so that after the discharge is completed a far greater quantity of zinc is dissolved or contained into this solution than could be possible by the old process, which consists in dissolving an oxid of zinc in this same solution before placing it in the battery.

Inasmuch as the excessive bulk and weight of the ordinary battery of this type is caused by the capacity of the alkaline solution ordinarily to take up, absorb, or otherwise contain but a relatively small quantity of oxid of zinc, necessitating a large quantity of solution for any battery having any considerable output, it is obvious that by the method described an electrolyte for this type of battery may be obtained which is very much reduced in weight and bulk, primarily because a sufficient quantity of zinc for a given capacity of battery-cell may be deposited in the charge upon the positive element and dissolved into the solution on the discharge. Obviously, also, a cell containing an electrolyte of the class described may be very much more quickly charged than in the ordinary cell of its kind, inasmuch as the electrolyte contains a great excess of zinc, which is held in solution in an unstable condition and which is therefore deposited almost immediately when the charging-current is applied.

I claim as my invention—

The method of accumulating an excess deposit of a metal, upon an electrode by repeatedly charging a cell containing in solution an oxid of the metal and a caustic alkali and replenishing the oxid in the solution between successive charges, then when sufficient of the metal has been deposited replenishing the cell with a solution of the pure caustic-alkaline solution.

In witness whereof I have hereunto subscribed my name in the presence of two subscribing witnesses.

WILLIAM GARDINER.

In presence of—
C. W. HILLS,
ANNA B. HILLS.